US008583677B1

(12) United States Patent
Johnston et al.

(10) Patent No.: US 8,583,677 B1
(45) Date of Patent: Nov. 12, 2013

(54) FACILITATING ACCESS TO MULTIPLE FACETS OF DATA

(75) Inventors: Simon K. Johnston, Snohomish, WA (US); Ramanathan Palaniappan, Seattle, WA (US); James K. Keiger, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 101 days.

(21) Appl. No.: 13/040,493

(22) Filed: Mar. 4, 2011

(51) Int. Cl.
*G06F 17/30* (2006.01)
(52) U.S. Cl.
CPC ............... *G06F 17/30017* (2013.01)
USPC ...................................................... 707/769
(58) Field of Classification Search
USPC ......... 707/706, 707, 769, 770, 803, 804, 805, 707/812
See application file for complete search history.

(56) References Cited

U.S. PATENT DOCUMENTS

| 8,001,521 B2* | 8/2011 | Aakolk et al. ............... 717/106 |
| 2005/0229101 A1* | 10/2005 | Matveyenko et al. ........ 715/530 |
| 2007/0288891 A1* | 12/2007 | Aakolk et al. ............... 717/114 |
| 2010/0153432 A1* | 6/2010 | Pfeifer et al. ................. 707/769 |
| 2011/0173220 A1* | 7/2011 | Jung et al. .................... 707/769 |

OTHER PUBLICATIONS

M Redstock., Efficiency and flexibility of multi-attribute negotiations—the role of business object frameworks, 2001, IEEE, 742-746.*

* cited by examiner

*Primary Examiner* — Jean B Fleurantin
(74) *Attorney, Agent, or Firm* — Thomas | Horstemeyer, LLP

(57) ABSTRACT

Disclosed are various embodiments for facilitating access to multiple facets of data. A registry is maintained for multiple facets for a type of business object. Each of the facets corresponds to a distinct set of properties for the type of business object. Two or more facets are hosted by different data stores. The type of business object has a common identifier for each one of the respective facets. A request for a listing of facets for the type of business object is obtained from a client. The listing of facets is provided to the client. The listing of facets is configured to facilitate access to data for each of the facets in the listing from the data stores for the client.

20 Claims, 7 Drawing Sheets

Select the Business Object Service to Browse — 200

Catalog Items: ● — 203a
Purchase Orders: ○ — 203b
Vendors: ○ — 203c ( Submit )  ( Cancel )
206          209

FIG. 2A

Retrieve Details from "Catalog Items" Services — 212

— Identify Item — 215
Catalog Country: [ US ] — 218a
Catalog SKU: [ 000000-00000-0 ]
                             — 218b — Facets to Retrieve —
Description: ☑ — 224a
Inventory Levels: ☐ — 224b
Pricing: ☑ — 224c
                           221

( Submit )  ( Cancel )
227          230

FIG. 2B

Response from "Catalog Items" Services — 233
                                          236
— Description —
Title: An Item — 239a
Category: Sale Items — 239b — Pricing —
Cost Price: $4.72 — 239c
List Price: $8.50 (Sys-1) — 239d
List Price: $8.50 (Sys-2) — 239e
                              242

FIG. 2C

FACILITATING ACCESS TO MULTIPLE FACETS OF DATA

BACKGROUND

In enterprise environments, data is often represented using business objects. A business object is an abstracted entity that may include a set of instance variables (also known as properties or attributes) and associations with other business objects. Business objects may correspond to coarse-grained concepts around which a business organizes. For example, a retailer may employ various types of business objects to represent products, vendors, customer orders, promotions, and so on.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A-2C are examples of user interfaces rendered by a client application executed in a client in the networked environment of FIG. 1A according to various embodiments of the present disclosure.

DETAILED DESCRIPTION

The present disclosure relates to facilitating access to multiple facets of data. A business object, such as an item, vendor, order, etc., may be understood as a unitary object by users. However, various facets of data for the business object may be split and maintained by different entities on different systems. Such facets may correspond, for example, to logical groupings of properties and relationships as well as time series data. As a non-limiting example, an item object may have a catalog representation that includes titles, categories, descriptions, colors, images, and so on. The item object may also have an inventory representation that includes quantities of the item that are in stock in various warehouses, whether items are in transit, how the items may be shipped, and so on. Further, the item object may have logistic views, forecasting views, pricing views, and other types of representations.

Various embodiments of the present disclosure support business users in making decisions by aggregating data from multiple facets of a business object to present a coherent view of the business object. To this end, interfaces are employed so that the various entities that maintain the multiple facets on different systems define the underlying business concept as a business object and agree on a common identifier for the business object. A hierarchically organized data facet registry with a discovery mechanism facilitates semantically directed browsing of the facets of a business object. In the following discussion, a general description of the system and its components is provided, followed by a discussion of the operation of the same.

Figure 1A:
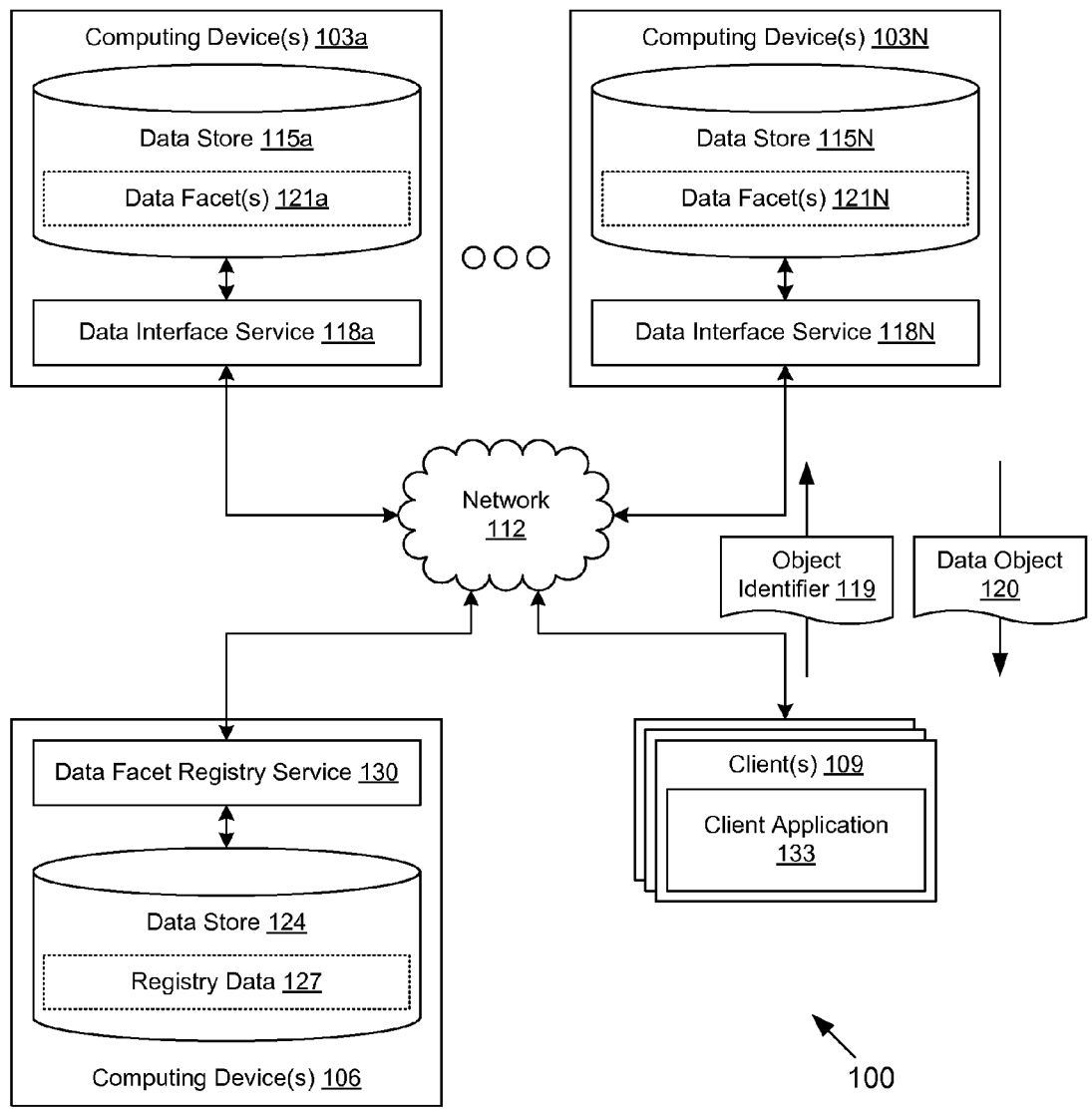
FIG. 1A is a drawing of a networked environment according to various embodiments of the present disclosure.

With reference to FIG. 1A, shown is a networked environment 100 according to various embodiments. The networked environment 100 includes a plurality of computing devices 103a ... 103N, one or more computing devices 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

Each computing device 103 may comprise, for example, a server computer or any other system providing computing capability. Alternatively, each computing device 103 may correspond to a plurality of computing devices 103 that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, each of the computing devices 103 is referred to herein in the singular. Even though each computing device 103 is referred to in the singular, it is understood that a plurality of computing devices 103 may be employed in the various arrangements as described above.

Various applications and/or other functionality may be executed in each computing device 103 according to various embodiments. Also, various data is stored in a corresponding data store 115a ... 115N that is accessible to the respective computing device 103. Each data store 115 may be representative of a plurality of data stores 115 as can be appreciated. The data stored in the data stores 115, for example, is associated with the operation of the various applications and/or functional entities described below.

The components executed on each computing device 103, for example, include a respective data interface service 118 and other applications, services, processes, systems, engines, or functionality not discussed in detail herein. The data interface service 118 is executed to provide access to data stored in the corresponding data store 115. To this end, the data interface service 118 may obtain an object identifier 119 from a client 109 and return a corresponding data object 120 to the client 109. The data object 120 may include one or more facets of a business object that are maintained by the respective computing device 103. Each facet of a given instance of a business object may have the same object identifier 119. In addition, the data objects 120 may be formatted in a similar manner for each facet. In one example, the data objects 120 are formatted using JavaScript object notation (JSON).

In some embodiments, the data interface service 118 may correspond to a web service in a service-oriented architecture. As such, the data interface service 118 may communicate with clients 109 by way of representational state transfer (REST), simple object access protocol (SOAP), hypertext transfer protocol (HTTP), and/or other communication protocols. In other embodiments, the data interface service 118 may correspond to a client application of a relational database management system (RDBMS) and/or any other facility that may be used to access data stored in the data store 115.

The data stored in each data store 115 includes, for example, one or more data facets 121 and potentially other data. In some embodiments, each data facet 121 is associated with a distinct set of properties. Each instance of a business object is uniquely identified by an identifier or key, which may correspond to values in one or more properties or attributes. The identifier is also used to identify an instance of a data facet 121. In some embodiments of the data store 115, the identifier may be said to be the primary key for the data facet 121. Although the data facets 121 corresponding to a business object may be spread across multiple data stores 115, it is noted that multiple data facets 121 may be stored in the same data store 115. Further, data facets 121 associated with different business objects may be stored in the same data store 115.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 124 that is accessible to the computing device 106. The data store 124 may be representative of a plurality of data stores 124 as can be appreciated. The data stored in the data store 124 includes, for example, registry data 127 and potentially other data. The data stored in the data store 124, for example, is associated with the operation of the various applications and/or functional entities described below.

The components executed on the computing device 106, for example, include a data facet registry service 130 and other applications, services, processes, systems, engines, or functionality not discussed in detail herein. The data facet registry service 130 is executed to provide access to the registry data 127, which hierarchically organizes data facets 121 under business objects. In some embodiments, the data facet registry service 130 may correspond to a web service in a service-oriented architecture. As such, the data facet registry service 130 may communicate with clients 109 by way of REST, SOAP, HTTP, and/or other communication protocols. In other embodiments, the data facet registry service 130 may correspond to a client application of an RDBMS and/or any other facility that may be used to access data stored in the data store 127.

In one non-limiting example, the registry data 127 is provided as a single JSON object, where each key corresponds to a unique identifier for a business object. The value for this key may correspond to another JSON object, for example, with an identifier key that describes the set of identifiers that are used to retrieve a specific instance of the business object, a descriptive label for the business object, and another JSON object having keys that each correspond to a specific facet. The identifier key may allow the clients 109 to determine the set of properties that are used to identify a business object. The facets key identifies a set of facets, which may each be described with a uniform resource locator (URL), a label, and additional properties.

Thus, the data facet registry service 130 may be configured to provide clients 109 with information such as how to access the various data facets 121 of a business object with the object identifiers 119 and how to interpret the data objects 120. In various embodiments, the data facet registry service 130 may be configured to interact with the data interface services 118 to aggregate data regarding a business object. Accordingly, the client 109 may interact with the data facet registry service 130 and not directly with the data interface services 118 in some embodiments.

The client 109 is representative of a plurality of client devices that may be coupled to the network 112. The client 109 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, or other devices with like capability. The client 109 may include a display that comprises, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a client application 133 and/or other applications. The client application 133 may be executed to interact with the data facet registry service 130 and, optionally, the data interface services 118 in order to obtain data related to business objects. In some embodiments, the client application 133 may be configured to render various user interfaces to facilitate presentation and browsing of business data. In some embodiments, the client application 133 may comprise a browser, terminal emulator, remote desktop client, and/or another type of application that may be employed to render user interfaces that may be generated in part on another device. The client 109 may be configured to execute applications beyond the client application 133 such as, for example, browser applications, email applications, instant message applications, and/or other applications.

Next, a general description of the operation of the various components of the networked environment 100 is provided. To begin, the data facet registry service 130 builds the registry data 127 through manual configuration, receipt of requests to add/modify/remove data facets 121, and/or discovery of new, changed, or missing data facets 121. The data facets 121 for a given type of business object reflect an agreement among diverse entities that maintain the data facets for a common identifier for the data facets 121. Further, the data facets 121 and data interface services 118 reflect an agreement for returning the data in a similar or standardized form of a data object 120 so that a client application 133 may process data objects 120 from newly discovered data facets 121 without updating the client application 133. In some cases, one or more data interface services 118 may correspond to legacy systems with no awareness of the concept of data facets 121. In such cases, an automatic discovery mechanism may not work, and the data facet registry service 130 may have to be manually configured to support the data facets 121 served up by the legacy systems.

After the registry data 127 is built, the client application 133 may request listings of business objects and/or the data facets 121 associated with the business objects from the data facet registry service 130. In some embodiments, the client application 133 may access the registry data 127 directly. The client application 133 is presented with a listing of data facets 121 for a given business object. From this listing, the client application 133 may be made aware of two important aspects about the data facet 121. First, the client application 133 may be made aware of the common identifier used to communicate with the data facet 121 for the business object. Second, the client application 133 may be made aware of how to communicate with the data interface services 118 that serve up the particular data facets 121. To this end, the listing of the data facets 121 may specify the data interface service 118 using web services description language (WSDL).

Accordingly, the client application 133 may communicate with the various data stores 115 and the data interface services 118 associated with them to obtain the data objects 120 corresponding to the data facets 121 for a given instance of a business object identified by an object identifier 119. The client application 133 may then process the data objects 120 for presentation to a user or some other use. It is noted that the client application 133 may interact directly with a user or with some other application or library. Where time series data facets 121 are used, the object identifier 119 may, for example, include a specified frequency or time window, e.g., hourly, weekly, monthly, etc. Where property data facets 121 are used, the object identifier 119 may, for example, include values for one or more of the properties.

It is noted that the client application 133 may be configured to store or cache the listing of data facets 121. Such a cached copy of the listing may facilitate direct access to the data facets 121 afterward by the client application 133. Alternatively, the client application 133 may be configured to request another copy of the listing of the data facets 121 each time the data is requested.

Figure 1B:
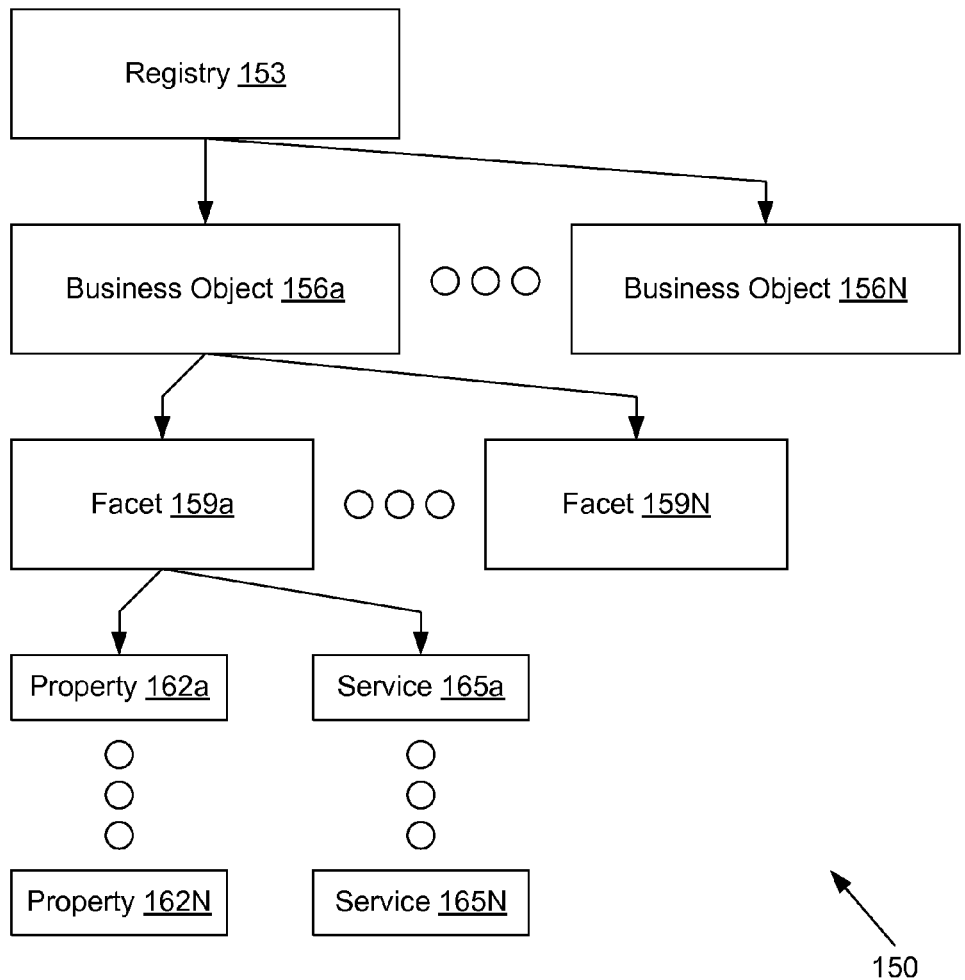
FIG. 1B is a drawing of a data model employed by a data facet registry service executed in a computing device in the networked environment of FIG. 1A according to various embodiments of the present disclosure.

Moving on to FIG. 1B, shown is an example of a data model 150 that may be employed by the data facet registry service 130 (FIG. 1A) executed in the computing device 106 (FIG. 1A) in the networked environment 100 (FIG. 1A). The data model 150 illustrates the hierarchical organization used by the data facet registry service 130. The data facet registry service 130 is represented by the root of the data model, the registry 153. The registry 153 may include a plurality of business objects 156a ... 156N, which each correspond to an abstract business concept such as, for example, catalog items, vendors, purchase orders, and so on.

Each of the business objects 156 may include a respective plurality of facets 159a ... 159N, each of which may correspond to a data facet 121 (FIG. 1A) hosted by one or more data interface services 118 (FIG. 1A). As a non-limiting example, for a business object 156 that corresponds to a catalog item, the business object 156 may have a description facet 159, an inventory level facet 159, a pricing facet 159, and/or other facets 159.

Each one of the facets 159 may have a plurality of properties 162a ... 162N and a plurality of services 165a ... 165N. Each of the properties 162 may correspond to some data field associated with the facet 159. As a non-limiting example, facet 159 that is a description facet 159 may have properties 162 such as a title property 162, a category property 162, and/or other properties 162. In addition, each one of the facets 159 may describe a plurality of services 165a ... 165N. Each of the services 165 may correspond to a data interface service 118 and may describe access instructions for the facet 159 from the respective data interface service 118.

Turning now to FIGS. 2A-2C, shown are non-limiting examples of user interfaces rendered by the client application 133 (FIG. 1A) executed in the client 109 (FIG. 1A) in the networked environment 100 (FIG. 1A). These examples are provided merely to illustrate three possible user interfaces that demonstrate principles of the present disclosure. In particular, the user interfaces of FIGS. 2A-2C illustrate the browsing and presentation of business data in the networked environment 100.

To begin, FIG. 2A depicts a user interface 200 for selecting types of business objects to browse. A plurality of radio buttons 203a, 203b, and 203c are provided to select from the various types of business objects. In this non-limiting example, the user interface 200 supports browsing for catalog items by selecting the radio button 203a, purchase orders by selecting the radio button 203b, and vendors by selecting the radio button 203c. Although radio buttons 203 are used in FIG. 2A, it is understood that other user interface components such as, for example, buttons, checkboxes, links, etc. may be used in other examples. In this example, the radio button 203a corresponding to "Catalog Items" is selected, while the radio buttons 203b and 203c corresponding to "Purchase Orders" and "Vendors," respectively, remain unselected.

A submit component 206 may be provided for a user to submit a selection, and a cancel component 209 may be provided for a user to reset the radio buttons 203 and/or dismiss the user interface 200. In one embodiment, when a user selects a radio button 203 and submits the form by way of the submit component 206, the selection of the type of business object may be transmitted from the client application 133 to the data facet registry service 130 (FIG. 1A) in order to retrieve a listing of the facets associated with the type of business object. In another embodiment, the registry data 127 (FIG. 1A) and/or the listing of the facets may be stored on the client 109 as a cached copy. In yet another embodiment, the data facet registry service 130 may be configured to generate the user interface 200 which is then rendered in the client 109.

Next, FIG. 2B depicts a user interface 212 that has been generated based at least in part on a listing of data facets 121 (FIG. 1A) associated with the selected type of business object, i.e., "Catalog Items." In this non-limiting example, it has been determined from the registry data 127 that a combination of a "Catalog Country" and "Catalog SKU" (stock keeping unit) are used to uniquely identify an instance of a "Catalog Item" business object. Accordingly, in an identifier specification area 215, two property specification components 218a, 218b are provided for a user to specify values for properties used to identify "Catalog Item" business objects. The property specification component 218a indicates that "US" has been specified as a value for the "Catalog Country" property. The property specification component 218b indicates that "000000-00000-0" has been specified as a value for the "Catalog SKU" property.

In a facet selection area 221, the user interface 212 permits a user to select one or more data facets 121 to be retrieved. Three facet selectors 224a, 224b, and 224c correspond to the data facets 121 of "Description," "Inventory Levels," and "Pricing," respectively. As illustrated, the data facets 121 of "Description" and "Pricing" are selected. Although the facet selectors 224 are depicted as checkboxes, it is understood that the facet selectors 224 may comprise buttons, links, radio buttons, and/or other user interface components in other embodiments. A submit component 227 may be provided for a user to submit a facet selection and identifier specification, and a cancel component 230 may be provided for a user to reset and/or dismiss the user interface 212.

Continuing on, FIG. 2C depicts a user interface 233 generated after obtaining data from the data facets 121 selected in FIG. 2B. Specifically, the data shown in FIG. 2C corresponds to an instance of the "Catalog Item" object having the "Catalog Country" property of "US" and the "Catalog SKU" property of "000000-00000-0." In a first facet presentation area 236, the user interface 233 shows in two property presentation components 239a and 239b that the "Description" facet for the object has a "Title" property of "An Item" and a "Category" property of "Sale Items." In other examples, facet properties may be multi-valued and/or have multimedia values.

In a second facet presentation area 242, the user interface 233 shows in three property presentation components 239c, 239d, and 239e that the "Pricing" facet for the object has a "Cost Price" property of "$4.72," a "List Price" property of "$8.50," and another "List Price" property of "$8.50." It is noted that two values for "List Price" properties are shown. The value shown in the property presentation component 239d is from a data interface service 118 (FIG. 1A) corresponding to "Sys-1," and the value shown in the property presentation component 239e is from a data interface service 118 corresponding to "Sys-2." Thus, in some embodiments, the same type of data facet 121 may be hosted by multiple systems, with potentially different data values.

Figure 3:
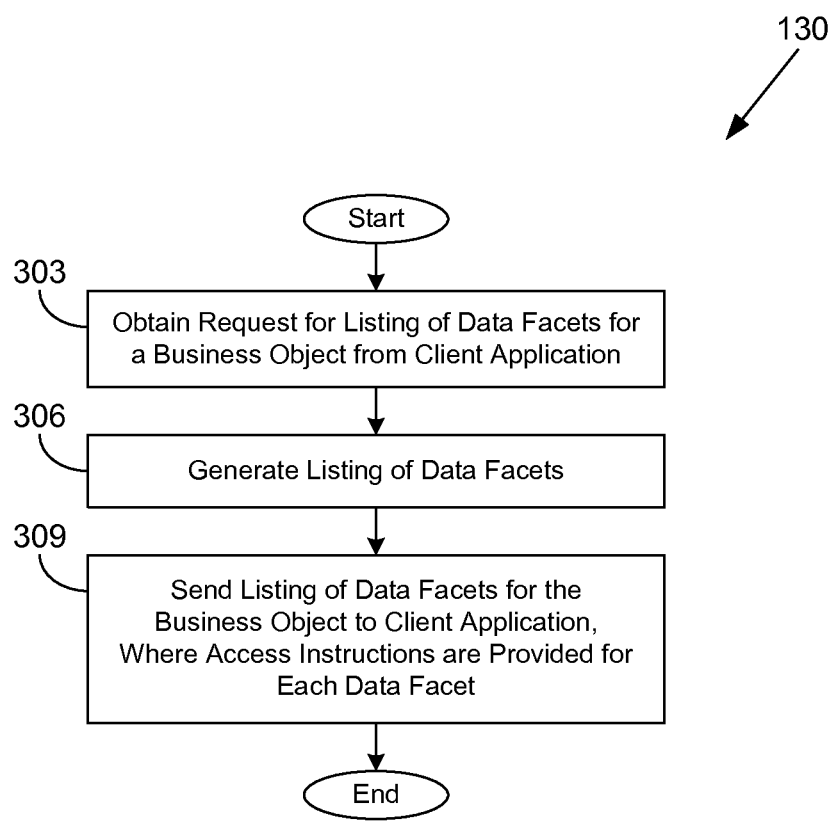
FIGS. 3 and 4 are flowcharts illustrating examples of functionality implemented as portions of a data facet registry service executed in a computing device in the networked environment of FIG. 1A according to various embodiments of the present disclosure.

Referring next to FIG. 3, shown is a flowchart that provides one example of the operation of a portion of the data facet registry service 130 according to various embodiments. It is understood that the flowchart of FIG. 3 provides merely an example of the many different types of functional arrangements that may be employed to implement the operation of the portion of the data facet registry service 130 as described herein. As an alternative, the flowchart of FIG. 3 may be viewed as depicting an example of steps of a method implemented in the computing device 106 (FIG. 1A) according to one or more embodiments. In particular, the flowchart of FIG. 3 relates to the data facet registry service 130 providing access to the registry data 127 (FIG. 1A).

Beginning with box 303, the data facet registry service 130 obtains a request for a listing of data facets 121 (FIG. 1A) for a business object from a client application 133 (FIG. 1A) over a network 112 (FIG. 1A). Such a request may be for the data facets 121 for all business objects in the registry data 127 or one or more specific business objects in the registry data 127. In box 306, the data facet registry service 130 generates a listing of data facets 121 from the registry data 127 in response to the request. In various embodiments, the data facet registry service 130 may enter a discovery mode in order to identify the various data facets 121 available on data stores 115 (FIG. 1A) in the networked environment 100 (FIG. 1A). For example, the data facet registry service 130 may query the data interface services 118 (FIG. 1A) to obtain a listing of facets served up by each data interface service 118.

In box 309, the data facet registry service 130 sends the listing of the data facets 121 to the client application 133, where access instructions are provided for each of the data facets 121 for the business object. For example, the access instructions may define URLs, security credentials, protocols, formatting, and/or other parameters for the client application 133 to be able to communicate with the respective data interface services 118 for the data facets 121. In one embodiment, the data facet registry service 130 may simply send all of the registry data 127 to the client application 133. Thereafter, the portion of the data facet registry service 130 ends.

Figure 4:
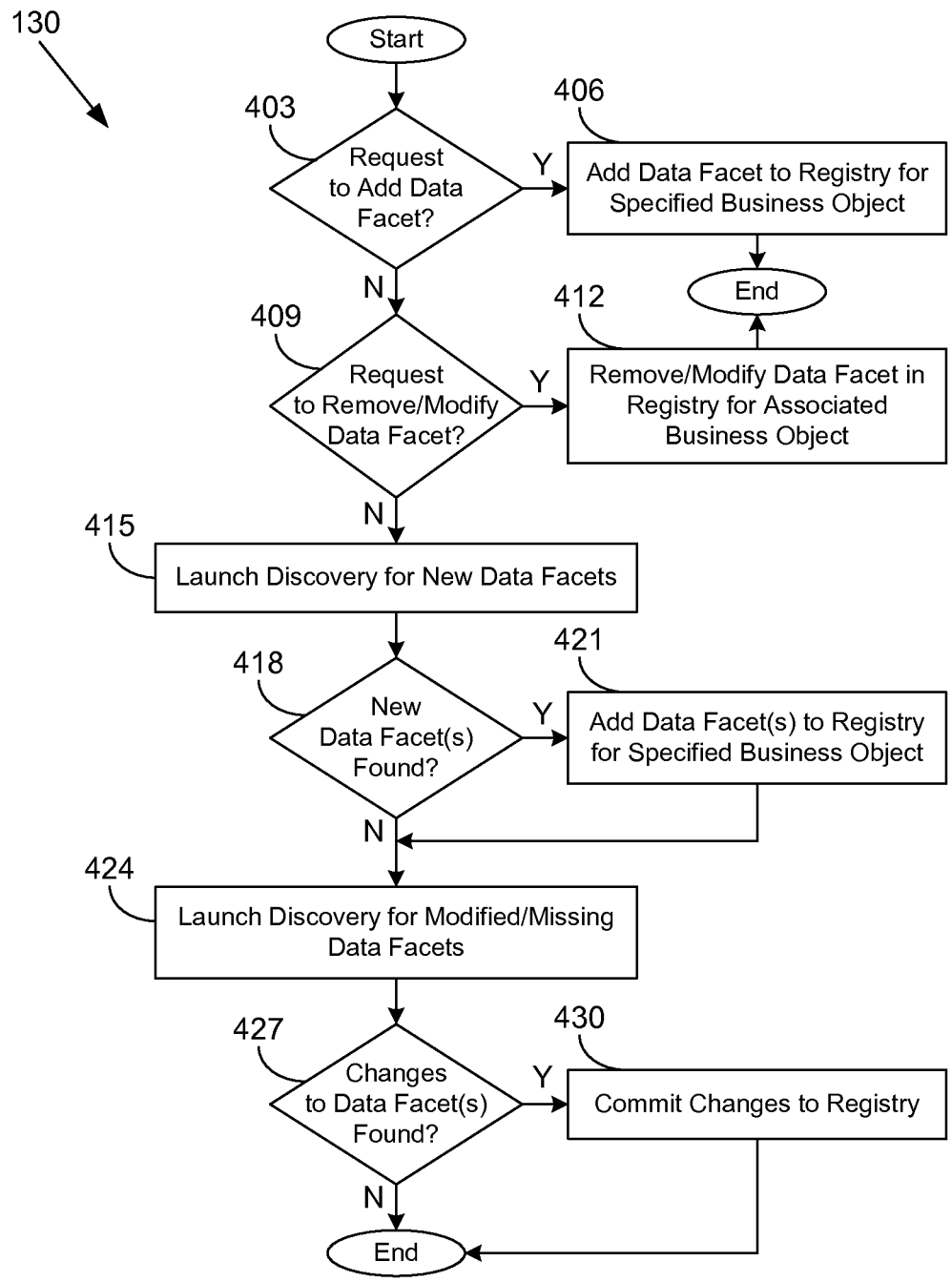

Turning now to FIG. 4, shown is a flowchart that provides one example of the operation of another portion of the data facet registry service 130 according to various embodiments. It is understood that the flowchart of FIG. 4 provides merely an example of the many different types of functional arrangements that may be employed to implement the operation of the portion of the data facet registry service 130 as described herein. As an alternative, the flowchart of FIG. 4 may be viewed as depicting an example of steps of a method implemented in the computing device 106 (FIG. 1A) according to one or more embodiments. In particular, the flowchart of FIG. 4 relates to the data facet registry service 130 constructing the registry data 127 (FIG. 1A).

Beginning with box 403, the data facet registry service 130 determines whether a request to add a new data facet 121 (FIG. 1A) has been obtained. If a request to add a new data facet 121 has been obtained, the data facet registry service 130 moves to box 406 and adds the data facet 121 to the registry data 127 for a specified business object. Thereafter, the portion of the data facet registry service 130 ends.

If a request to add a new data facet has not been obtained, the data facet registry service 130 proceeds to box 409. In box 409, the data facet registry service 130 determines whether a request to remove or modify a data facet 121 has been obtained. If a request to remove or modify a data facet 121 has been obtained, the data facet registry service 130 moves to box 412 and removes or modifies the data facet 121 in the registry data 127 for its associated business object. Thereafter, the portion of the data facet registry service 130 ends.

If a request to remove or modify a data facet 121 has not been obtained, the data facet registry service 130 continues to box 415. In box 415, the data facet registry service 130 launches a discovery approach for new data facets 121. In such a discovery approach, the data facet registry service 130 may communicate with various data interface services 118 (FIG. 1A) in the networked environment 100 (FIG. 1A) in order to ascertain whether additional data facets 121 are available. In box 418, the data facet registry service 130 determines whether new data facet(s) 121 have been found as a result of the discovery. It is noted that some data interface services 118 may correspond to legacy systems that do not support such a discovery mechanism. If new data facets 121 have been found, in box 421, the data facet registry service 130 adds the discovered data facets 121 to the registry data 127 for the specified business object identified by the respective data interface service 118. The data facet registry service 130 proceeds to box 424. If new data facets 121 have not been found, the data facet registry service 130 also proceeds to box 424.

In box 424, the data facet registry service 130 launches a discovery approach for modified or missing data facets 121. In such a discovery approach, the data facet registry service 130 may communicate with various data interface services 118 in the networked environment 100 in order to ascertain whether data facets 121 have been modified or removed. It is noted that some data interface services 118 may correspond to legacy systems that do not support such a discovery mechanism. In box 427, the data facet registry service 130 determines whether data facet(s) 121 have been found to be changed as a result of the discovery. If data facets 121 have been found to be modified or missing, in box 430, the data facet registry service 130 commits the changes to the registry data. Thereafter, the portion of the data facet registry service 130 ends. If no data facets 121 are found to be modified or missing, the data facet registry service 130 also ends.

Figure 5:
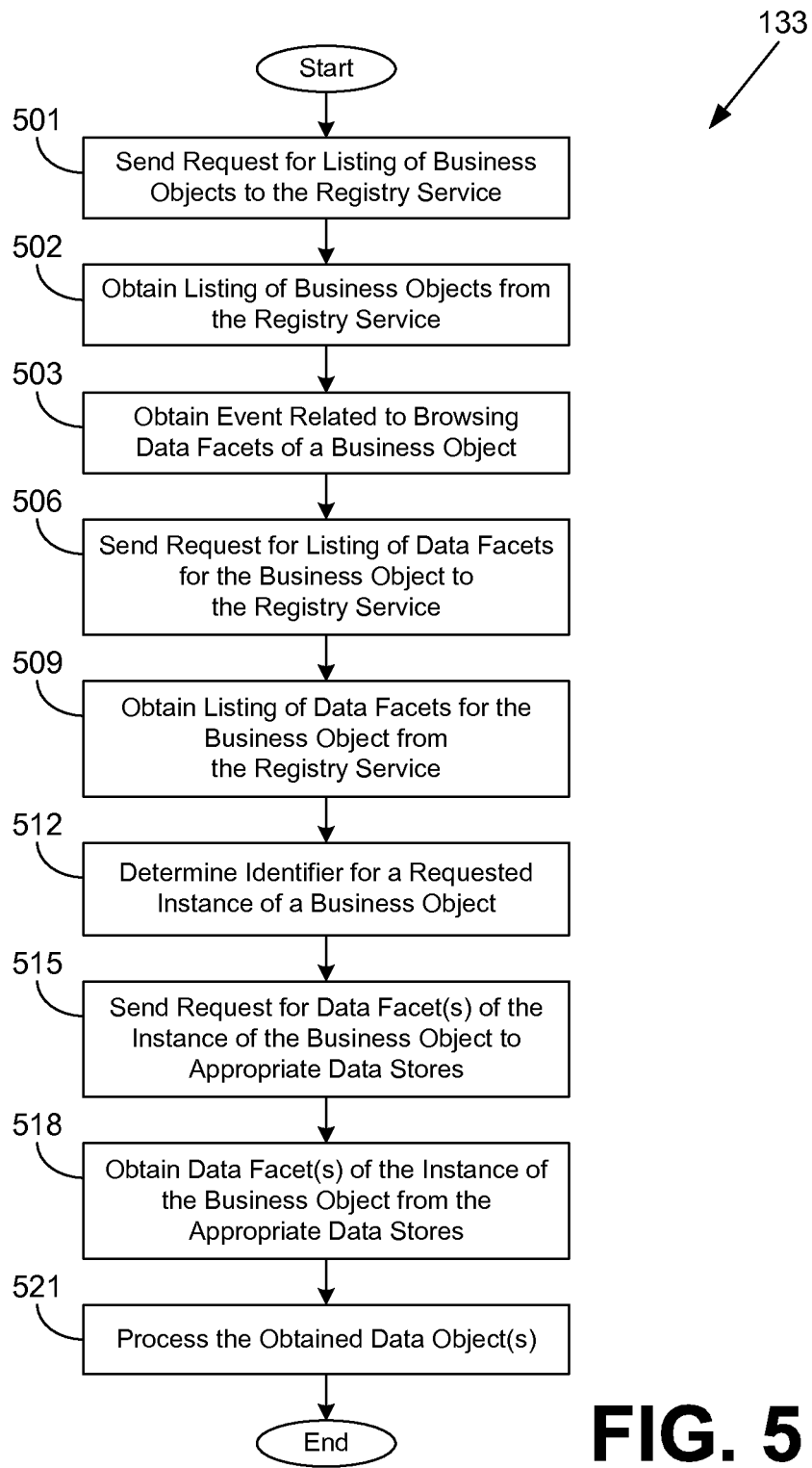
FIG. 5 is a flowchart illustrating one example of functionality implemented as portions of a client application executed in a client in the networked environment of FIG. 1A according to various embodiments of the present disclosure.

Moving on to FIG. 5 shown is a flowchart that provides one example of the operation of a portion of the client application 133 according to various embodiments. It is understood that the flowchart of FIG. 5 provides merely an example of the many different types of functional arrangements that may be employed to implement the operation of the portion of the client application 133 as described herein. As an alternative, the flowchart of FIG. 5 may be viewed as depicting an example of steps of a method implemented in the client 109 (FIG. 1A) according to one or more embodiments.

Beginning with box 501, the client application 133 sends a request for a listing of business objects to the data facet registry service 130 (FIG. 1A) executed in the computing device 106 (FIG. 1A). In box 502, the client application 133 obtains the listing of business objects from the data facet registry service 130. In box 503, the client application 133 obtains an event related to browsing data facets 121 (FIG. 1A) of a business object. For example, the client application 133 may present a user interface 200 (FIG. 2A), and obtain a selection of a business object from the listing of business objects in the user interface 200. In box 506, the client application 133 sends a request for a listing of data facets 121 for the business object to the data facet registry service 130 executed in the computing device 106. In box 509, the client application 133 obtains the listing of data facets 121 for the business object from the data facet registry service 130. In one embodiment, the registry data 127 (FIG. 1A) may be obtained directly.

In box 512, the client application 133 determines the common identifier for a requested instance of a business object. For example, the client application 133 may present a user interface 212 (FIG. 2B) to the user for the user to specify values for various attributes that comprise the identifier for the type of business object. In box 515, the client application 133 sends a request for data facet(s) 121 of the instance of the business object to the appropriate data stores 115 (FIG. 1A). Such a request may correspond to the object identifier 119 (FIG. 1A). In one example, all data facets 121 for the object identifier 119 are requested. In another example, only selected ones of the data facets 121 (e.g., selected in a user interface 212 or other configuration source) are requested.

In box 518, the client application 133 obtains the data facets 121 of the instance of the business object from the appropriate data stores 115. Such data facets 121 may be transmitted to the client application 133 within one or more data objects 120 (FIG. 1A) that include time series data items and/or sets of properties. Although the client application 133 may be described as communicating with the data stores 115, it is understood that such communication may encompass communicating with the data interface services 118. In box 521, the client application 133 processes the obtained data objects 120. For example, the client application 133 may render a user interface 233 (FIG. 2C) to display the data associated with the data facets 121 to a user. Thereafter, the portion of the client application 133 ends.

Figure 6:
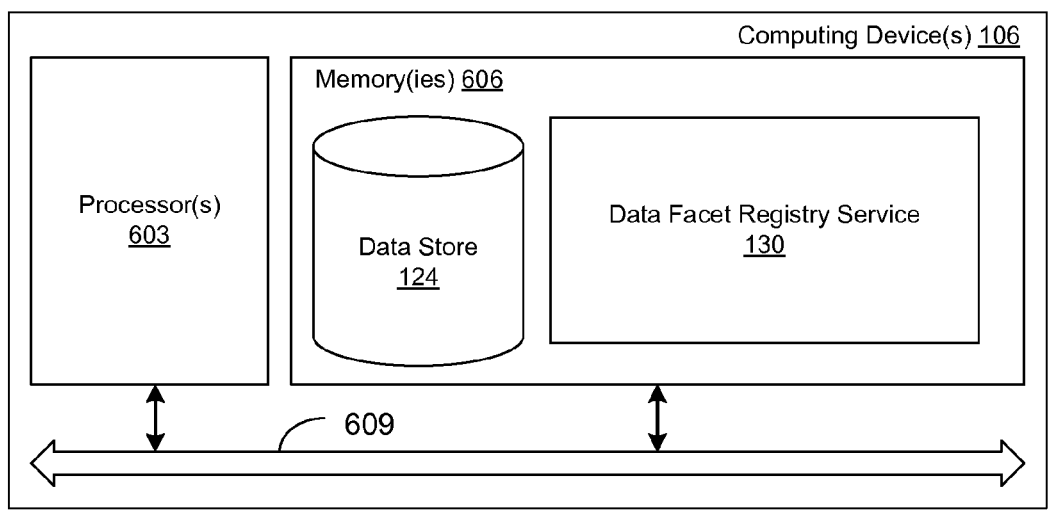
FIG. 6 is a schematic block diagram that provides one example illustration of a computing device employed in the networked environment of FIG. 1A according to various embodiments of the present disclosure.

With reference to FIG. 6, shown is a schematic block diagram of the computing device 106 according to an embodiment of the present disclosure. The computing device 106 includes at least one processor circuit, for example, having a processor 603 and a memory 606, both of which are coupled to a local interface 609. To this end, the computing device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the data facet registry service 130 and potentially other applications. Also stored in the memory 606 may be a data store 124 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 112 (FIG. 1A) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data facet registry service 130, the data interface service 118 (FIG. 1A), the client application 133 (FIG. 1A), and other various systems described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the data facet registry service 130 and the client application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data facet registry service 130, the data interface service 118, and the client application 133, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:

code that maintains a registry for a plurality of facets for each of a plurality of types of business objects, at least one of the facets corresponding to a distinct set of properties for a respective one of the types of business objects, at least another one of the facets corresponding to time series data for the respective one of the types of business objects, at least two of the facets for the respective one of the types of business objects being hosted by different ones of a plurality of data stores, wherein the respective one of the types of business object has a common identifier for each one of the respective facets, wherein the respective one of the types of business objects corresponds to an item, one of the facets corresponds to a catalog representation for the item, and another one of the facets corresponds to an inventory representation for the item;

code that discovers another facet for the respective one of the types of business objects by querying at least one of the data stores;

code that adds the another facet to the registry;

code that obtains a request for a listing of facets for the respective one of the types of business objects from a client;

code that provides the listing of facets for the respective one of the types of business objects to the client; and wherein the listing of facets is configured to facilitate access to data for each of the facets in the listing from the data stores for the client, and each of the data stores is managed by a different entity.

2. The non-transitory computer-readable medium of claim 1, wherein the program further comprises code that adds another type of business object to the registry.

3. A system, comprising:

at least one computing device;

a plurality of data stores accessible to the at least one computing device by way of a network; and a data facet registry service executable in the at least one computing device, the data facet registry service comprising:

logic that maintains a registry for a plurality of facets for a type of business object, each of the facets corresponding to a distinct set of properties for the type of business object, at least two of the facets for the type of business object being hosted by different ones of the data stores, wherein the type of business object has a common identifier for each one of the respective facets;

logic that obtains a request for a listing of facets for the type of business object from a client;

logic that provides the listing of facets for the type of business object to the client, wherein the listing of facets is configured to facilitate access to data for each of the facets in the listing from the data stores for the client; and logic that automatically discovers another facet for the type of business object by querying at least one of the data stores.

4. The system of claim 3, wherein the data facet registry service further comprises:

logic that removes one of the facets for the type of business object from the registry; and wherein the logic that provides the listing of facets for the type of business object is reconfigured to exclude the one of the facets from the listing.

5. The system of claim 3, wherein the registry is maintained for a plurality of types of business objects.

6. The system of claim 3, wherein each of the data stores is configured to return data for at least one of the facets for the type of business object by a common data interface.

7. The system of claim 3, wherein each of the data stores is controlled by a separate entity.

8. The system of claim 3, wherein the listing of facets describes a corresponding interface for obtaining data for each of the facets using web services description language (WSDL).

9. The system of claim 3, wherein at least one of the facets corresponds to time series data regarding the type of business object.

10. A system, comprising:

at least one computing device;

a plurality of data stores accessible to the at least one computing device by way of a network; and a data facet registry service executable in the at least one computing device, the data facet registry service comprising:

logic that maintains a registry for a plurality of facets for a type of business object, each of the facets corresponding to a distinct set of properties for the type of business object, at least two of the facets for the type of business object being hosted by different ones of the data stores, wherein the type of business object has a common identifier for each one of the respective facets;

logic that obtains a request for a listing of facets for the type of business object from a client;

logic that provides the listing of facets for the type of business object to the client, wherein the listing of facets is configured to facilitate access to data for each of the facets in the listing from the data stores for the client;

logic that adds another facet for the type of business object to the registry; and wherein the logic that provides the listing of facets for the type of business object is reconfigured to include the another facet in the listing.

11. The system of claim 10, wherein the registry is maintained for a plurality of types of business objects.

12. The system of claim 10, wherein the data facet registry service further comprises:

logic that removes one of the facets for the type of business object from the registry; and wherein the logic that provides the listing of facets for the type of business object is reconfigured to exclude the one of the facets from the listing.

13. The system of claim 10, wherein each of the data stores is controlled by a separate entity.

14. A method, comprising:

obtaining, in a computing device, a listing of a plurality of facets for a type of business object from a registry server, wherein each of the facets correspond to a distinct set of properties for the type of business object, at least two of the facets for the type of business object are hosted by different ones of a plurality of data stores, and the type of business object has a common identifier for each one of the respective facets;

sending, in the computing device, a request for a first one of the facets for an instance of the type of business object to a first one of the data stores over a network, the request for the first one of the facets identifying the instance by a value for the common identifier;

sending, in the computing device, a request for a second one of the facets for the instance to a second one of the data stores over the network, the request for the second one of the facets identifying the instance by the value for common identifier; and obtaining, in the computing device, a first data object corresponding to the first one of the facets for the instance from the first one of the data stores; and obtaining, in the computing device, a second data object corresponding to the second one of the facets for the instance from the second one of the data stores.

15. The method of claim 14, wherein at least one of the facets corresponds to time series data regarding the type of business object.

16. The method of claim 14, further comprising rendering, in the computing device, a user interface that describes at least one property of the first data object and at least one property of the second data object.

17. The method of claim 13, further comprising rendering, in the computing device, a user interface that describes the listing of the facets.

18. The method of claim 17, wherein the user interface facilitates semantically directed browsing for the type of business object.

19. The method of claim 14, further comprising sending, in the computing device, another request for the first one of the facets for the instance of the type of business object to a third one of the data stores over the network, the another request for the first one of the facets identifying the instance by the value for the common identifier.

20. The method of claim 14, further comprising:

storing, in the computing device, a copy of the listing of the facets in a cache;

sending, in the computing device, a request for a third one of the facets for another instance of the type of business object to a third one of the data stores over the network; and wherein an interface to the third one of the data stores is determined according to the copy of the listing of the facets stored in the cache.

* * * * *